US006574294B1

(12) United States Patent
Lynch et al.

(10) Patent No.: US 6,574,294 B1
(45) Date of Patent: Jun. 3, 2003

(54) DATA STREAMING FOR NON-DMA DIGITAL COMPUTING DEVICES

(75) Inventors: John Lynch, San Jose, CA (US); James B. Nichols, San Mateo, CA (US)

(73) Assignee: Apple Computer, Inc., Cupertino, CA (US)

( * ) Notice: Subject to any disclaimer, the term of this patent is extended or adjusted under 35 U.S.C. 154(b) by 0 days.

(21) Appl. No.: 08/701,008

(22) Filed: Aug. 21, 1996

Related U.S. Application Data

(63) Continuation of application No. 08/478,036, filed on Jun. 7, 1995, which is a continuation of application No. 08/058,750, filed on May 7, 1993.

(51) Int. Cl.[7] .................................................. H04L 7/00
(52) U.S. Cl. ........................... 375/354; 710/46; 710/49; 710/262
(58) Field of Search ................................. 375/358, 354; 370/85.8, 85.1, 95.2; 395/200.13, 200.14; 710/46–49, 262

(56) References Cited

U.S. PATENT DOCUMENTS

| | | | |
|---|---|---|---|
| 4,730,308 A | | 3/1988 | Friedman et al. |
| 4,951,281 A | * | 8/1990 | Mato et al. ................. 370/85.8 |
| 5,020,020 A | * | 5/1991 | Pomfret et al. ......... 395/200.13 |
| 5,036,459 A | * | 7/1991 | den Haan et al. ....... 395/200.14 |
| 5,170,394 A | * | 12/1992 | Biber et al. ................. 370/85.8 |
| 5,303,345 A | * | 4/1994 | Iguchi et al. .......... 395/200.14 |
| 5,530,597 A | * | 6/1996 | Bowles et al. ............... 710/262 |

FOREIGN PATENT DOCUMENTS

EP  0 425 845  5/1991

OTHER PUBLICATIONS

"Data and Computer Communications" William Stallings pp. 142–152, 1985 New York.*
BYTE, Oct. 1981, St Peterborough US, pp. 50–66.
Computer Design, vol. 22, No. 1, Jan. 1983, Littleton, Massachusetts US.

* cited by examiner

Primary Examiner—Temesghen Ghebretinsae
(74) Attorney, Agent, or Firm—Burns, Doane, Swecker & Mathis, L.L.P.

(57) ABSTRACT

High-speed data streams are exchanged between two digital computing devices one or both of which lacks DMA. Data transfers are performed by the devices using High-Level Datalink Control (HDLC) frames. An initiating device indicates that it wishes to exchange data with the other device by sending an HDLC frame with data stream indentification and other information. The initial HDLC-frame is sufficiently short that at least an essential portion of the frame can be stored in a receive buffer of the interface circuitry. Although the receiving device may not receive the entire HDLC frame correctly because of the possibility of an overrun condition, enough information is preserved in the interface circuitry to complete the transaction. The responding device then proceeds to read or write data at high speed using a series of exchanges with the initiating device.

6 Claims, 6 Drawing Sheets

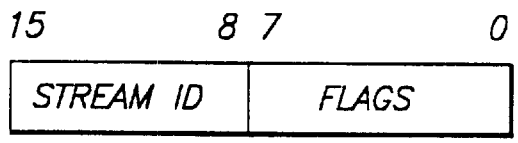
FIG. 4A POLL FRAME FORMAT
FIG. 4B POLL FRAME WITH LENGTH FORMAT
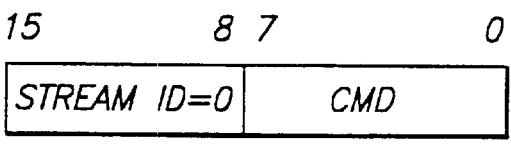
FIG. 4C STREAM ZERO POLL FRAME FORMAT
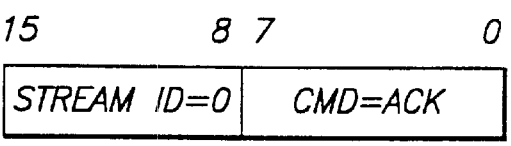
FIG. 4D ACK FRAME FORMAT
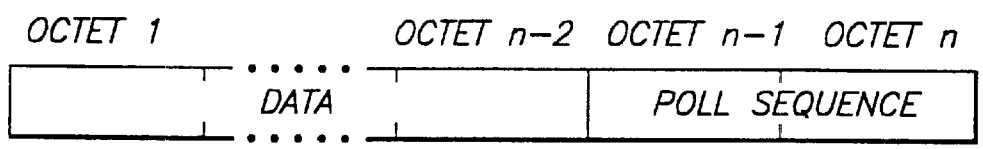
FIG. 4E DATA FRAME FORMAT
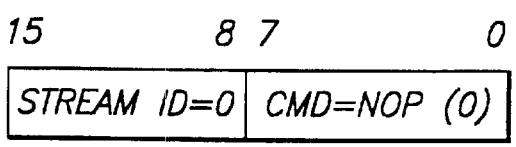
FIG. 4F NOP FRAME FORMAT

DATA STREAMING FOR NON-DMA DIGITAL COMPUTING DEVICES

This application is a continuation, of application Ser. No. 08/058,750, filed May 7, 1993.

This application is a continuation, of application Ser. No. 08/478,036, filed Jun. 7, 1995.

BACKGROUND OF THE INVENTION

1. Field of the Invention

The present invention relates to serial data communications and more particularly to high-speed serial data communcations with digital computing devices lacking the capability of direct memory access (DMA).

2. State of the Art

Personal computers with modems now access a wide variety of networks. Although modem communications is generally adequate for exchanging text files, the transmission of digital voice, fax and video data, especially simultaneous, requires a data rate that exceeds the capabilites of most modems. The Integrated Services Digital Network (ISDN) is designed to provide what appears to the user to be one unified network satisfying all user needs. Demonstrations networks are currently being installed in several countries. In ISDN networks, a digital adapter serves as the communications equipment. Since the data is digital throughout the network, the function of a modem becomes unnecessary.

Newer computers are typically equipped with high-speed serial interfaces that use direct memory access (DMA). Older machines and less-expensive machines, however, are generally equipped with relatively slow serial interfaces that lack DMA capability. These machines typically have interface circuitry that must be totally serviced by the central processing unit (CPU).

In a typical computer equipment interface, shown in simplified form in FIG. 1, a Universal Synchronous/Asynchronous Receiver Transmitter (USART) handles most of the format conversions needed. USARTs allow users to specify operating characteristics of supported equipment by loading a predefined code word or bit pattern. Level converters convert voltages from those used by the physical layer (serial cable) to those for computer equipment. Control signals pass across the interface. The USART uses program addressable Receiver Status and Transmitter Status Registers to store precise status, including, for example (in accordance with the RS-232C standard) the status of Ring, Request to Send, Clear to Send, Data Set Ready, Data Terminal Ready, and Carrier Detect lines, bits to enable interrupts and cause them if they are enabled, and so forth. These bits include one for Received Data Available (RDA) in the Receiver Status Register and one for Transmitter Buffer Empty (TBMT) in the Transmitter Status Register, both of which are set, when appropriate, by the USART.

When a register is read, the Address Selection Logic gates contents of the appropriate register (Receiver Buffer, Receiver Status Register or Transmitter Status Register) onto the CPU bus data lines. Conversely, when a register is written, data on the CPU bus come into the Bus Receivers and are presented to the appropriate register via the Parallel Data lines. The Address Selection Logic then strobes the data into the register.

During receiving, all bits comprising a character are assembled in the USART. It then sets the RDA bit in the Receiver Status Register, causing an interrupt to be generated as soon as interrupts are enabled. The computer program responds to the interrupt and reads the Receiver Buffer. It next uses a circuit, Reset Data Available, to assure the USART that it is safe to replace data in its Receive Buffer with new data. If this is not finished before the USART needs to shift a character into the buffer (in order to have space to assemble a new character), a bit indicating Overrun Error is set and passed to the CPU to deal with as it wishes.

During transmission, the USART sets the TBMT bit when the Transmit Buffer is empty. This bit is passed to a Transmitter Status Register in the CPU and causes an interrupt. The CPU checks to see if it has anything to send on the line. If it does, it loads it into the USART's Transmit Buffer and clears the TBMT bit. The USART shifts the character from the Transmit Buffer into another register, resetting the TBMT bit, and shifts the character out a bit at a time.

Referring to FIG. 2, showing a block diagram of a typical USART, the USART can operate as either a synchronous or an asynchronous receiver/transmitter, depending on bits in the Mode Register. Bits in this register also determine the number of bits per character, whether even parity, odd parity, or no parity is used, and details of treatment of certain characters. In addition, for asynchronous mode, the register determines the speed of the transmit and receive clocks with respect to the bit rate.

The Status Register contains the Received Data Available (RDA) and Transmitter Buffer Empty (TBMT) bits discussed above, plus bits indicating Parity Error, Framing Error, and Overrun Error and bits for modem control. Since the USART is programmable, simple commands cause it to examine status bits and execute transmit and receive functions.

During synchronous data reception, the USART uses incoming clock signals to determine when to sample voltage on the Received Data line; each sample is classified as a "0" or "1" and shifted into the Receive Register. When this register is full, the bits are shifted in parallel into the Receive Buffer and the RDA bit is set, causing an interrupt to the CPU. The USART also searches for characters that indicate frames are starting, using information in its Mode Register. Error bits in the Status Register are set when errors are detected.

During synchronous data transmission, characters obtained from the CPU, after interrupts initiated by the TBMT bit, are shifted in parallel from the Transmit Buffer to the Transmit Register and out onto the line a bit at a time. The USART automatically inserts control characters to start frames. As soon as a character has been shifted into the Transmit Register, the TBMT bit is set and the process restarts. Data reception and transmission can go on simultaneously in a full duplex manner.

The primary difference between synchronous and asynchronous operation is in clocking; no external clocking is available for asynchronous operation. A clock running at approximately some multiple of the bit rate (16 to 64 times) is used. Voltage on the Received Data line is examined each clock time until a transition from "1" to "0" is seen. This is a transition from an idle line condition to the voltage for a START bit. If the clock is running at 16 times the bit rate, further samples are taken 8, 24, 40, and so forth, clock times later. The first sample should be approximately at the middle of the START bit, the second near the middle of the first data bit, and so forth. Given a reasonably accurate clock, sampling times are accurate enough to sample all bits in a character. The sampled bits are shifted into the Receiver Register, with the rest of the operation essentially the same as for the synchronous case.

Transmission of asynchronous data using the USART is done in the same manner as transmission of synchronous data, except for using the internal clock instead of an externally derived clock, and shifting a bit out once every 16 (to 64) clock cycles instead of every clock cycle.

Somewhat more sophisticated than a simple USART is a Serial Communications Controller (SCC, for example device number Am8530H sold by Advanced Micro Devices). The SCC is able to pull out data portions of received frames, discarding overhead information, or inserting overhead information in transmitted frames. Error detection with polynomial codes commonly used with data link controls are also implemented.

The interface of FIG. 1 is limited in its performance. The interface can use excessive CPU cycles responding to interrupts, since it interrupts the CPU for every character received or transmitted. Interrupt service routines for typical communications interfaces take 25 to 200 us, with getting into the service routine and out of it again sometimes taking nearly as much time as the service routine itself. High-speed serial interfaces, on the other hand, use DMA to read or write blocks of data without interrupting the CPU, except to initiate or conclude block transfers or deal with exceptional conditions.

In order to allow non-DMA capable machines (including older machines and current less-expensive machines) to function in an ISDN or similar environment, a more powerful serial interface mechanism is required.

SUMMARY OF THE INVENTION

The present invention, generally speaking, provides for the exchange of high-speed data streams between two digital computing devices one or both of which lacks DMA. In a preferred embodiment, data transfers are performed by the devices using High-Level Datalink Control (HDLC) frames. An initiating device indicates that it wishes to exchange data with the other device by sending an HDLC frame. The initial HDLC frame is sufficiently short that at least an essential portion of the frame can be stored in a receive buffer of the interface circuitry. Although the receiving device may not receive the entire HDLC frame correctly because of the possibility of an overrun condition, enough information is preserved in the interface circuitry to complete the transaction. The responding device then proceeds to read or write data at high speed using a series of exchanges with the initiating device.

BRIEF DESCRIPTION OF THE DRAWINGS

The invention may be further understood from the following description in conjuction with the appending drawings. In the drawings:

FIGS. 4(a) to 4(f) are diagrams of frame formats in accordance with a polled receive protocol;

DETAILED DESCRIPTION OF THE PREFERRED EMBODIMENTS

In an integrated digital communications environment, multiple data streams may be exchanged on a single connection. In ISDN, for example, basic access provides access to two 64 kbps full duplex basic access (B) channels for user data and one 16 kbps full duplex (D) channel for transmission of control data and lower-speed user data. Accomodating these channels on a single physical serial link requires multiplexing.

Figure 3:
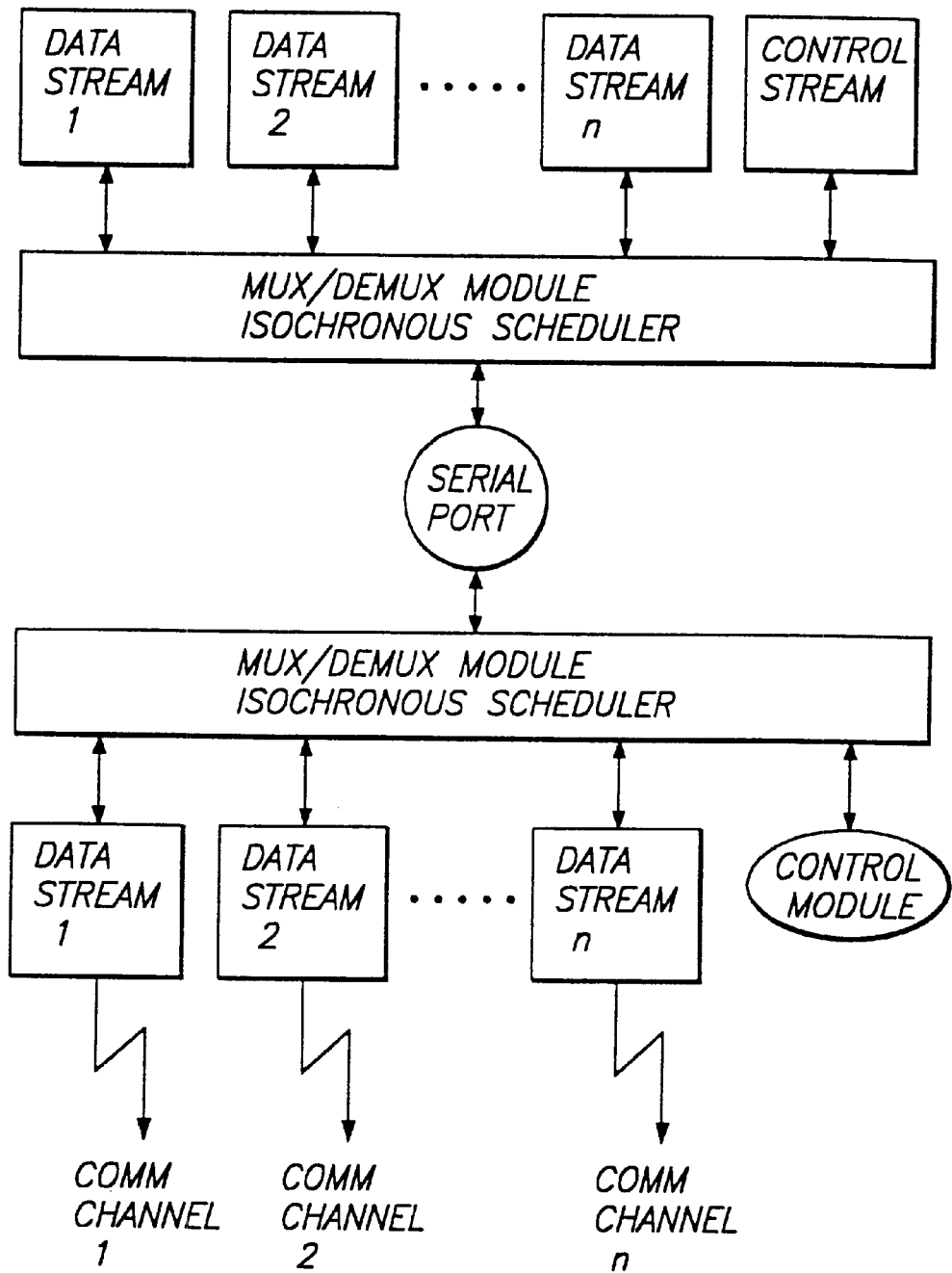
FIG. 3 is a diagram of a multiple-streams communications environment.

A packetized interface allows multiple data streams to be multiplexed across the serial port along with one or more control streams as shown in FIG. 3. In the case of a modem or digital adapter (referred to generically hereinafter as communications "pods") connected to a computer through a serial cable, the control stream may originate from a computer software "pod handler." The control stream may be used to control connections on the data streams in addition to controlling general pod functions.

The packetized interface employs HDLC framing; i.e., a flag character "01111110" (0x7E) is sent at the beginning and end of a frame, with zero bit stuffing used inside the frame. Bit stuffing, when the flag character occurs in the data stream itself, causes a "0" to be inserted between the fifth and sixth "1"s to break up the pattern (i.e., instead of the flag character, the pattern "011111010" is sent). At the receiver, the stuffed bits are removed before passing the data to the device.

HDLC framing is advantageous in cases where data is transferred in large blocks, as is typically the case for the packetized interface. In a preferred embodiment, all data is encoded in non-return-to-zero (NRZ) format.

The data streams of FIG. 3 may be of three basics types: isochronous, command, and asynchronous. Isochronous streams carry constant bit rate data such as voice or video. This data is collected in frames of fixed size which repeat at a specific period called the frame period. In the case of ISDN, for example, a 64 kbps "B" channel carrying voice data would typically repeat with 80 bytes every 10 ms. Command streams are used to send command and responses between the computer and the pod (or, more generally, between the two digital computing devices). Asynchronous streams are typically used to carry traditional computer data, e.g., data of a type commonly exchanged via AppleTalk, Internet, or some other computer network.

These different types of data streams provide different types of services for the data being sent on those streams in terms of flow control, stream or block mode service, etc. Flow control refers to the capability of regulating the flow of data between the digital computing devices. Flow control prevents the transmitter from overrunning the receiver.

Isochronous streams do not provide any flow control since, by definition, data must be consumed at each side within the set frame period. Command streams use stop and wait flow control; i.e., once a command is sent, another command cannot be sent until a response is received from the other side. The response may include user data that is passed back to the client that issued the command.

Asynchronous streams use a sliding window flow control mechanism to assure that the transmitter does not overflow the receiver. Sliding window flow control allows for higher bandwidths than stop and wait flow control. In traditional protocols, sliding window flow control processes are complicated due to the fact that they incorporate error recovery algorithms. In the case of a computer equipment interface in which communication is occurs across a relatively short serial cable, however, the interace may be assumed to be error free. Error recovery is therefore not required. Apart from sliding window flow control, rate control is also provided from the computer to the pod to assure that all streams get reasonable access to the bandwidth of the interface, especially relative to the stream's ultimate data channel rate.

Data streams can also be differentiated by whether they provide stream mode or block mode service. Stream mode service simply delivers a stream of bytes from one side to the other without regard to the block of data they were originally sent with. Block mode service always delivers data in the original block provided by the transmitting client. Isochronous streams are inherently stream mode. Command streams, on the other hand, are inherently block mode interfaces; i.e., commands and responses are delivered as a whole unit to the other side. Asynchronous streams can be configured to provide either stream or block mode service.

A priority is associated with command and asynchronous streams which controls which stream's data gets sent first on the serial interface.

In one particular embodiment, one byte is used as a stream identifier, supporting 256 possible separate streams. In another embodiment, each of the streams is identified by a shorter, 3 bit ID in order to allow the length of the frame, in bytes, to be transmitted. In this instance, 8 streams are supported. In either case, Stream Zero is used to send special protocol control packets, and is not available for data transfer. Thus the total number of data streams is 7 in the length field receive mode and 255 otherwise.

Figure 1:
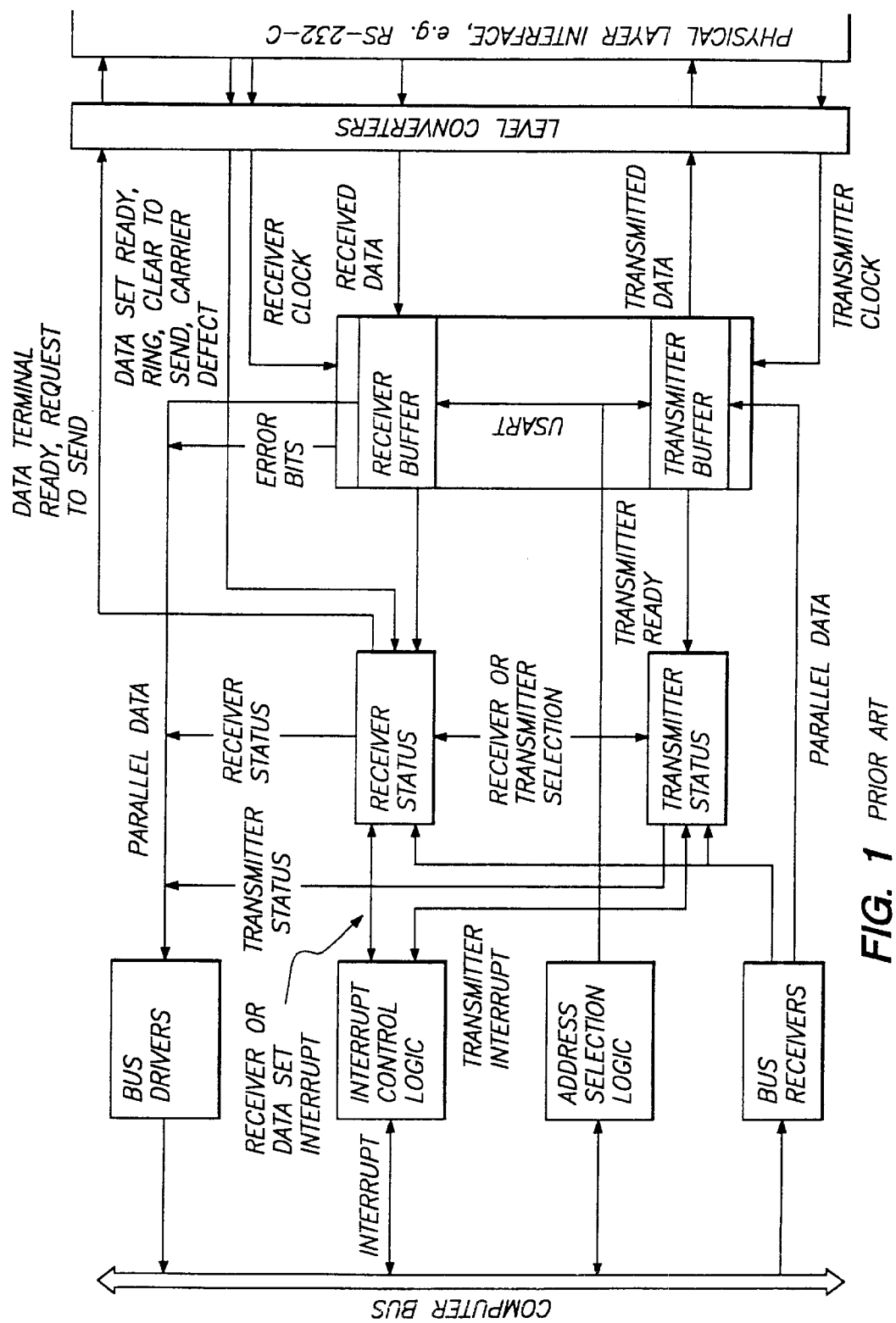
FIG. 1 is a simplified block diagram of a conventional computer equipment interface.
Figure 2:
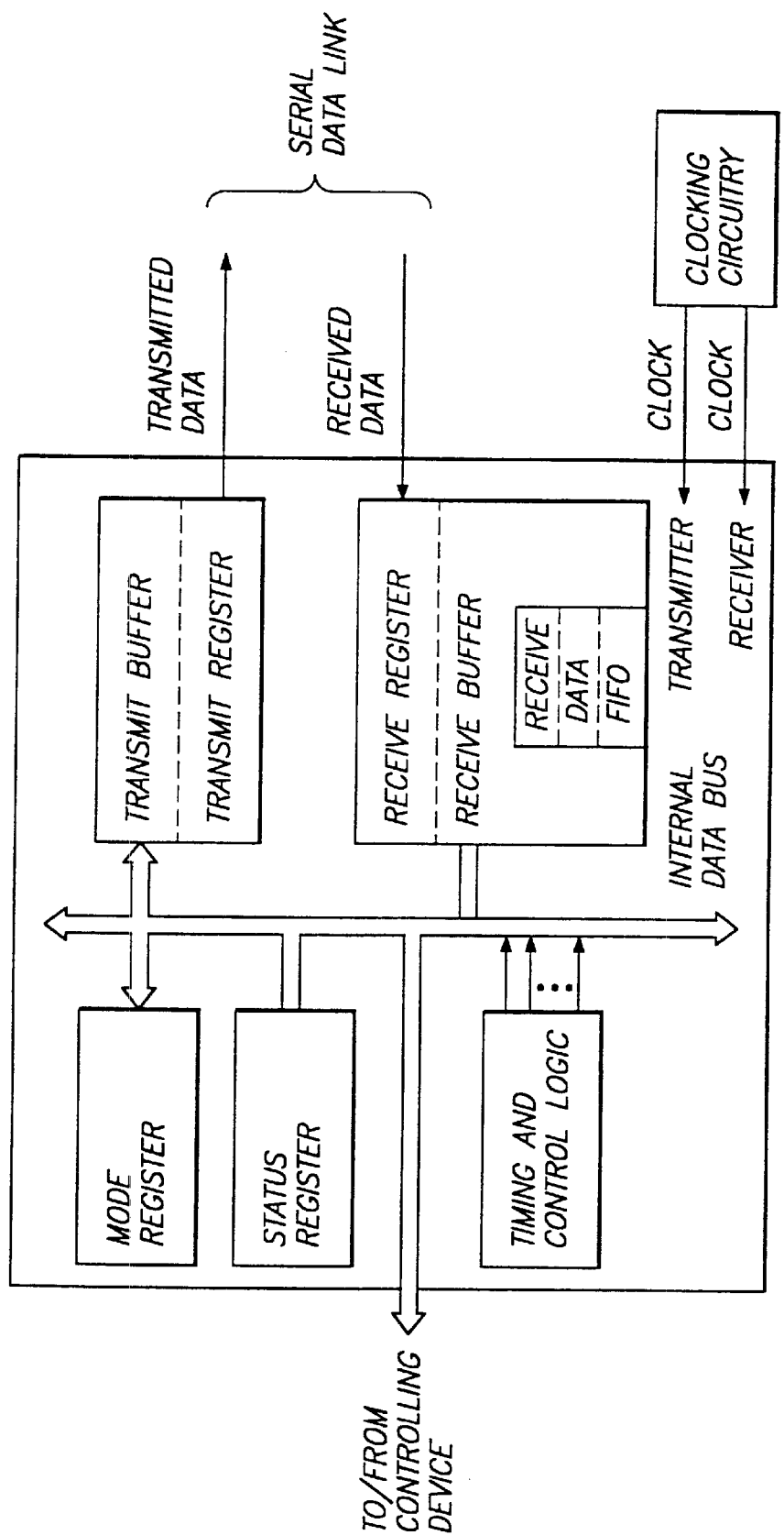
FIG. 2 is a block diagram of the USART of FIG. 1.

In the absence of DMA, a polled receive protocol is used, to be presently described. The polled packet receive mode assumes that the receiver is capable of receiving two-byte poll and acknowledge (ack) frames at any time. This may be guaranteed when the USART or SCC of the interface circuitry has a three (or more) byte FIFO as illustrated in FIG. 2. Even if a period of time elapses before the receiver responds to a receive interrupt, the data will remain intact in the FIFO.

Referring to FIGS. 4(a) to 4(f), in accordance with the present polled receive mode protocol, when side 'a' wants to send data to side 'b', it sends a poll frame (FIG. 4(a) or 4(b)). When side 'b' has received the poll frame and is ready to receive the data, it responds with an ack frame (FIG. 4(d)). At this point, side 'b' must be prepared to receive the data frame. When side 'a' receives the ack frame, it sends the data frame (FIG. 4(e)).

During an initial "beacon" phase of operation preceding the foregoing exchange, a maximum data frame size is negotiated between the two digital computing devices. The maximum data frame size may be subsequently sized down (or up) using a SetMaxRcvFrameSize command described below.

When the receiver sends an ack frame, it must be prepared to service the serial port continuously. On a computer that does not have DMA, this is accomplished by turning off other interrupts so as to allow the CPU to be completely attentive to the serial port. The computer will therefore typically limit the data frame size it receives and sends so as to limit the amount of time that it keeps interrupts turned off during reception and transmission of data frames. For example, at a rate of 918 kbps, the transmission time for 255 bytes is 2.2 ms.

Since, on data transfers from the pod to the computer, the computer's interrupts are turned off from the start of the computer's sending the ack packet until the data packet has been completely received from the pod, the pod's ack response time should be kept to a minimum. In other words, the maximum interrupt off time is dependent on the maximum response time of the pod from receipt of the ack packet to the beginning of the data packet. This time, the pod's ack response time, is specified to have a maximum of 1 ms, since it can have a dramatic effect on both the performance of the serial interface and on the computer system as a whole.

Three types of poll frames are defined, shown in FIGS. 4(a), 4(b) and 4(c). The first two types are used to send data on all streams except Stream Zero. The third type of poll frame is used on Stream Zero only.

The first type of poll frame shown in FIG. 4(a) includes only a stream ID field and a flag field. This arrangement allows support for 255 data streams, not counting Stream Zero. The second poll frame, shown in FIG. 4(b), includes a length field. The length field allows for more efficient reception of HDLC data in a polled software loop. When length is not indicated, status must be repeatedly read from the SCC to determine whether it has recognized the HDLC end-of-frame flag character. When the length of the data (in bytes) is indicated in the length field, the occurrence of End of Frame may be determined by simply counting the number of bytes received. The greater efficiency of the resulting software loop allows data to be received at higher data rates.

The first byte of the Stream Zero poll frame, shown in FIG. 4(c), uses the value zero to identify Stream Zero. The second byte identifies a specific Stream Zero command. Some Stream Zero commands have associated parameters. In this case, once the receiving side sends the ack frame, the sender will send a data frame consisting of the associated parameters. If there are no associated parameters, then no frame will be sent in response to the ack frame.

The ack frame is simply a Stream Zero command, as shown in FIG. 4(d). It does not include the associated stream ID, which was indicated in the poll frame, since only one poll can be outstanding at any one time in each direction.

The data frame, shown in FIG. 4(e), contains, in order, the data and, optionally, an appended poll sequence indicating another frame to follow. The appended poll sequence eliminates the need for the sender to send a separate poll frame in order to send more data. This feature allows for more efficient transfer of large amounts of data. If the two trailer bytes are both "0", this constitutes a Stream Zero no-op (NOP) frame as shown in FIG. 4(f). A NOP frame indicates that there are no more frames to be sent. If the trailer does indicate that there is more data, then the receiver simply responds with an ack frame, and another data frame will be sent.

The flags field is described hereinafter.

If the computer is in the process of sending data to the pod when it receives a poll packet from the pod, it will, after the completion of the current HDLC frame to the pod, send an ack and receive data from the pod. The computer will not return to the transmit process until after completing the receive process. The computer therefore gives higher priority to thee receive process than the transmit process.

Figure 5:
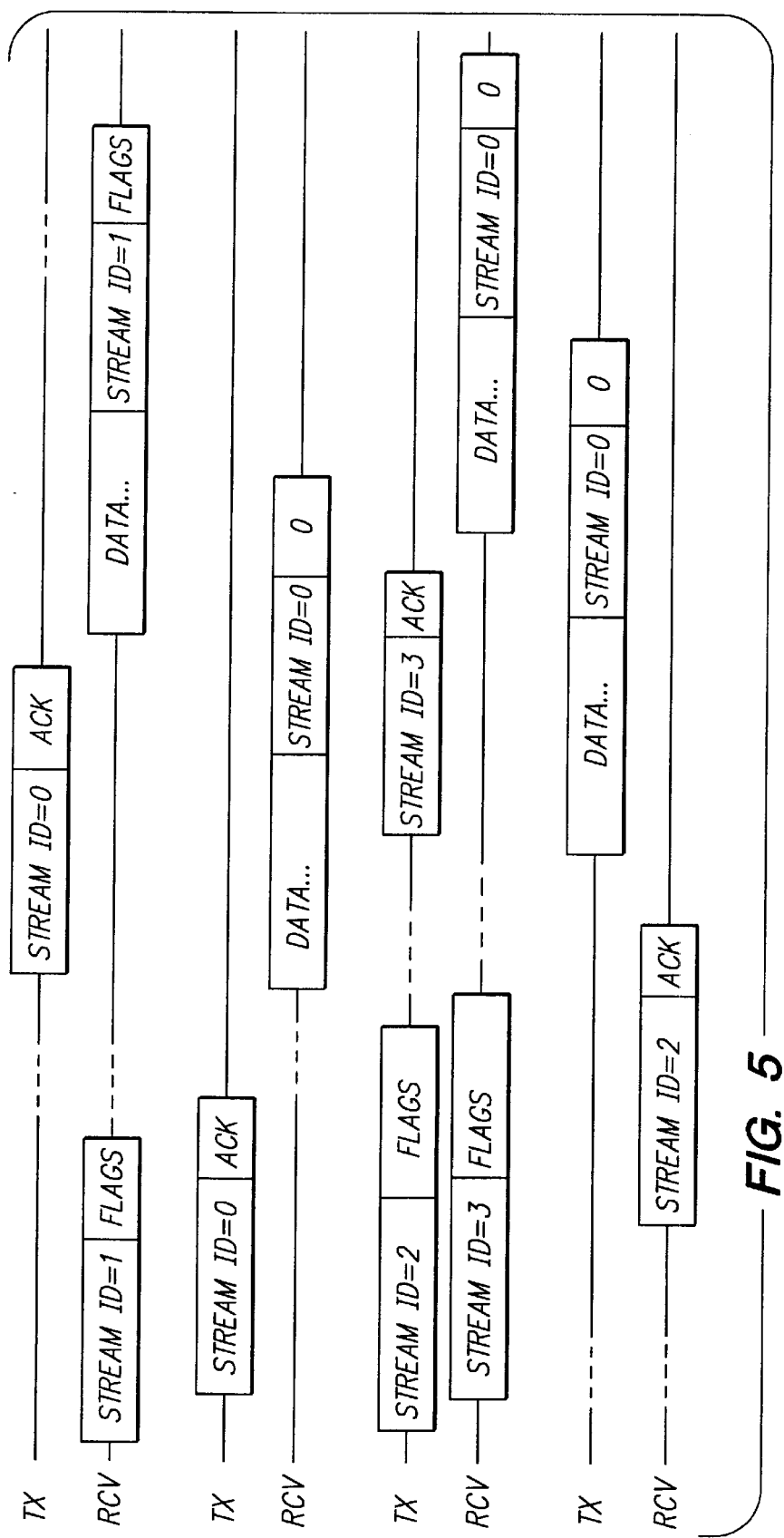
FIG. 5 is a diagram of a series of packet exchanges using the frame formats of FIGS. 4(a) and 4(c) to 4(f)

FIG. 5 illustrates a series of packet exchanges on the polled receive mode interface. The transmit (Tx) and receive (Rcv))designations are from the standpoint of the receiving device. The exchanges occur in a continuous sequence read from left-to-right and from top-to-bottom.

Figure 6:
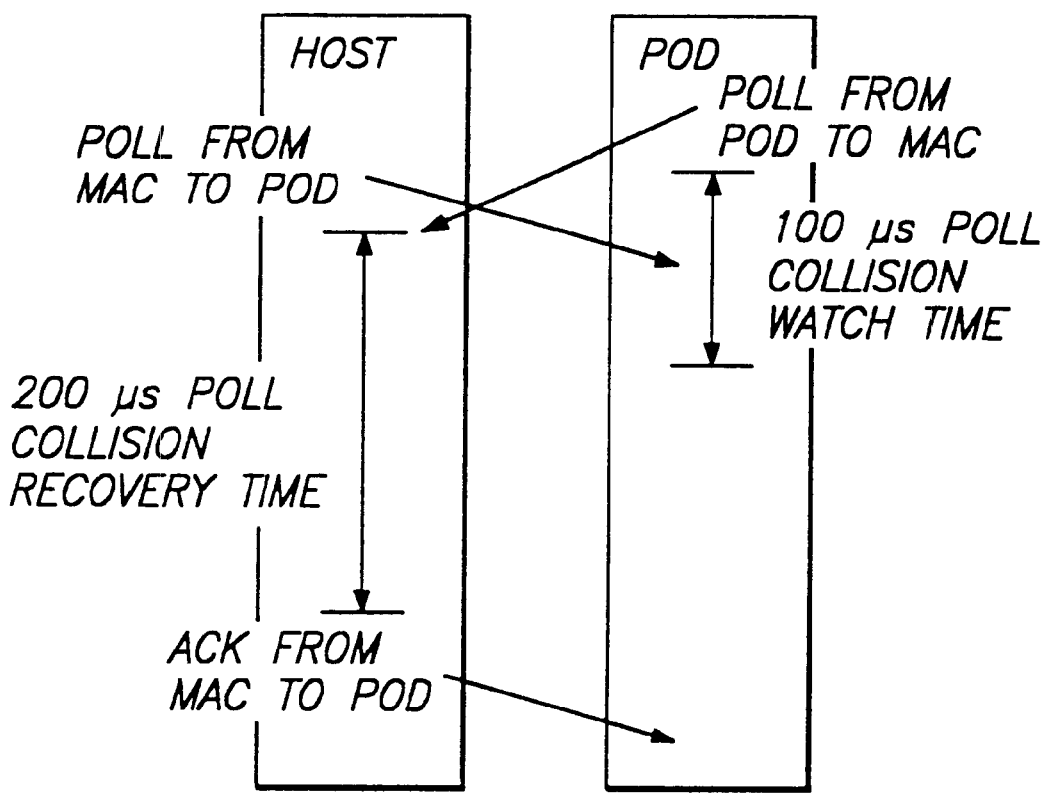
FIG. 6 is a diagram illustrating a poll frame collision situation resolution procedure.

When both the computer and the pod are using the polled receive mode, a situation can arise where they both send a poll frame at the same time, which is called a poll frame collision. This condition is shown in FIG. 6. A deadlock situation could arise in this case, since both the computer and the pod are waiting for an ack frame to send their data. In order to avoid deadlock, the pod is given higher priority, and a method is provided by which the computer and the pod can recover from a poll frame collision.

The pod, knowing that both the computer and the pod are operating in the polled received mode, waits for 100 us after sending a poll frame in order to see if it gets a poll frame from the computer. If it gets a poll frame within this time period, it reads it into memory and remembers the contents so it can be serviced later. When the computer receives a poll frame from the pod while it is waiting for an ack frame to its own poll frame, it will wait for at least 200 us before sending the ack frame to the pod. The computer and the pod will therefore continue with the pod's transfer of data to the computer. When this is complete, the pod sends an ack frame in resonse to the outstanding poll frame from the computer, and the computer then completes its transfer to the pod.

Isochronous data exchange is supported, without DMA, using an Isochronous Data Driven Mode. This mode may be used to support isochronous streams which do not have as critical timing requirements as, say, a CCITT V.32 sample stream. The pod simply monitors its receive sample buffers, containing data from the communications line, which the pod sends to the computer across the serial interface. When a programmable threshold, determined by latency requirements and the amount of buffer space in the pod, is met, the pod then initiates the isochronous data exchange by sending isochronous data to the computer.

When the computer begins to receive isochronous data from the pod, the computer may respond with an equal or lesser amount of outbound isochronous data. If the computer does not have an equal amount of data to send, it will respond with less data, or with no data. (An example of this situation might be the case of a message machine, when a greeting that is being played is completed.)

Stream Zero is reserved to send control and status packets that are used to control the serial protocol. The command value is sent in the poll frame, and any associated parameters are sent in the following data frame. If there are no parameters, then no data frame is sent.

The following commands are defined:

NOP ( )=0x00

NOP indicates no operation. It is primarily used at the end of a polled receive mode data frame to indicate that no more immediate frames are to be sent.

Ack ( )=0x01

Ack is used in the polled receive mode protocol to indicate to the sender of a poll frame that the receiver of the poll frame is prepared to receive the associated data frame.

Nak ( )=0x02

Nak is used in the polled receive mode protocol to indicate to the sender of a poll frame that the receiver of the poll frame is not prepared to receive the associated data frame.

SetMaxRcvFrameSize (ushort MaxRcvFrameSize)=0x10

SetMaxRcvFrameSize indicates to the receiver of this command that it should limit all future frames it sends to this maximum size. The sender of the SetMaxRcvFrameSize command should still be capable of receiving frames up to the maximum size negotiated at beacon time, since some packets may be sent before the size can be adjusted. The SetMaxRcvFrameSize command may be expected to be used often by the computer to adjust the interrupt-off time in response to varying processing requirements in the computer.

GetDataResponseTime ( )=0x10

GetDataResponseTime is sent by the computer to request the pod to send an estimate of its Data Response Time in a SetDataResponseTime command described next.

SetDataResponseTime (ulong DataResponseTime)=0x11

SetDataResponseTime is sent by the pod in response to receiving the GetDataResponseTime command from the computer. The timing indicated by this command is only used by the computer while receiving back-to-back data frames from the pod. When the pod sends a poll sequence in the trailer of a data packet which indicates that it has more data to send, it may take some time for the pod to prepare the next set of data. The DataResponseTime indicates the maximum time in microseconds that the pod will require to prepare the next set of data to send to the computer. The computer will typically not respond with the ack then, but will wait until this time has elapsed in order to limit the time that interrupts are turned off.

All stream data between the computer and the pod is accompanied by a flags byte. Some flag bits have meaning on all streams, while others are specific to the type of stream of the packet.

For isochronous streams, the following flags are defined:

Bit 0 BOB: A "1" in the Beginning of Block (BOB) bit is used to indicate that this packet is the first packet of a block of isochronous data. The first packet indicates the total number of bytes which will be sent by appending a two-byte length field at the end of the packet.

Bit 1 EOB: A "1" in the End of Block (EOB) bit is used to indicate the end of a block of isochronous data.

The following flags are defined on command streams:

Bit 0 BOB: A "1" in the BOB bit indicates that this packet is the first packet of a command or response, which are always transferred as a block.

Bit 1 EOB: A "1" in the EOB bit indicates that this packet is the last packet of a command or response.

Bit 2 Command/Response: a "0" indicates that this is a Command, and a "1" indicates that this is a Response.

Flags defined on asynchronous streams are as follows:

Bit 0 BOB: A "1" in the BOB bit is used on block-mode asynchronous streams to indicate that this packet is the first packet of a block of data which is to be delivered to the client as one unit. This bit has no meaning on stream-mode asynchronous streams.

Bit 1 EOB: A "1" in the EOB bit is used on block-mode asynchronous streams to indicate that this packet is the end of a block of data. This bit has no meaning on stream-mode asynchronous streams.

Bit 2 Includes Credit: This bit is set to indicate that a two-byte argument is appended to the end of the packet which is the receive credit, to be described presently, for this asynchronous stream.

Sliding window flow control is used on asynchronous streams. Conventionally, the sliding window algorithm is used not only for flow control, but also to provide error correction. However, the present serial interface may be considered to be error-free, such that the sliding window algorithm is used simply for flow control. As a result, the sending side does not need to retain data until its receipt is acknowledged. Instead, the window is simply a credit of how much data the receiving side is willing to accept, simplifying the use of the algorithm.

The flow control credit is a 16-bit quantity which starts at zero upon initialization. When stream-mode service is being provided, the flow control credit is given in units of bytes. When the block-mode service is being provided, the flow control credit is given in units of client blocks or packets. The sending side keeps track of two variables, sent and send credit. Send credit is the value sent by the receiver indicating how much data it is willing to accept. Sent is the amount of data that has been sent. At any one time, the transmitter is allowed to send no more than (send credit—sent) data units.

The receiver intially sends a send credit equal to the amount of free buffer space that has been allocated. When data is received and processed, and the buffer space is again freed up, the send credit is increased by the amount of buffer space freed. This send credit is then communicated to the sender as a Stream Zero command.

The following example illustrates the case of an asynchronous stream providing stream-mode service:

1. The receiver allocates a receive buffer of 1000 bytes and sends a send credit value of 1000 to the sending side;
2. The sender sends 100 bytes to the receiver and bumps its sent variable to 100. At this point, the transmitter could send 1000−100=900 more bytes;
3. The receiver processes the data and frees up the buffer space;
4. The receiver bumps the send credit value to 1000+100=1100 and sends this to the sending side;
5. The sender is now allowed to send (send credit—sent) bytes to the receiver, namely 1100−100=1000.

Since, in a non-DMA receive mode, data is transferred directly to the stream buffers in the receiving device, primary flow control, i.e. flow control at the multiplexing level, is not required. Rather, flow control on a per-stream basis is sufficient to guarantee proper flow control.

Stop and wait flow control is used on command streams. Stop and wait flow control allows only one block to be outstanding on a stream in each direction at one time. However, the stream handlers at each side will usually queue up multiple transmit requests for the client. If sending a block of data requires more than one frame, then the block will be sent in multiple frames with the EOB bit in the flags byte set in the last packet. Another block will not be sent on the stream until a response has been received from the other side. The response is also sent as a block with the Response bit in the flags bit set.

The following is an example of the order of events in sending data on a Stop and Wait stream:

1. The sending client requests to send some data;
2. The computer's serial driver queues up the data on the client's stream queue;
3. The data reaches the head of the stream's queue when the response to the previous data has been received. It is then scheduled on the serial line and finally sent in one or more frames;
4. On the receiving side, the data is posted to the receiving client;
5. When the receiving client indicates to the receiver's serial driver that it is finished with the data, a response frame is sent back to the originating side, possibly including response data;
6. When the originating serial driver receives the response, it completes the originating send to the sending client, along with any response data.
7. The originating serial driver is now allowed to send the next data request on the stream.

Rate control is used on asynchronous data streams only and provides a basic level of pacing of transmit data from the computer to the pod. This helps assure that all asynchronous streams get fair access to the serial port bandwidth.

Rate control may be performed using the same or similar algorithm as in XTP (Xpress Transfer Protocol), in which rate control is characterized by the following three parameters:

1. Rate—the rate of the communications line in bytes/sec. (E.g., for an ISDN "B" channel, this would be 8 KBytes/sec.)
2. Burst—the maximum number of bytes to be sent in a burst of packets.
3. RTimer—equal to Burst/Rate, which is the period over which the channel's data rate is held to Burst number of bytes.

The basic algorithm works as follows. A rate credit is allocated to each stream, the rate credit being initially set to the Burst value. As each packet is transmitted, the rate credit is decremented by the number of bytes in the packet. When the rate credit reaches zero or less, no more data can be sent on this stream until the RTimer expires, at which time each stream's credit is adjusted as follows:

1. If the rate credit is zero or less, then the Burst value is added to the current value of the rate credit.

2. If the rate credit is greater than zero, then the rate credit is simply set to the Burst value.

Rate control does not require any interaction between the computer and the pod, since the algorithm is executed totally within the computer. Rate control may be implemented from the pod to the computer, but is not required, since the rate is inherently limited by the rate of data being received on the communication channels.

The foregoing has described the principles, preferred embodiments and modes of operation of the present invention. However, the invention should not be construed as limited to the particular embodiments discussed. Instead, the above-described embodiments should be regarded as illustrative rather than restrictive, and it should be appreciated that variations may be made in those embodiments by workers skilled in the art without departing from the scope of the present invention as defined by the following claims.

What is claimed is:

1. A method of inputting data from a digital device to a computer at high speed through a serial port of the computer, the computer including a system CPU and an interrupt mechanism for interrupting the system CPU, the interrupt mechanism having associated with it a characteristic interrupt latency between when an interrupt is received and when servicing of the interrupt is actually begun, and the serial port of the computer including a communications buffer having a predetermined small number of bytes of buffer storage, the method comprising the steps of:

a) the serial port of the computer autonomously receiving in the communications buffer, from the digital device, a multiple-byte poll frame;

b) the computer reading the poll frame from the communications buffer;

c) the computer acknowledging to the digital device receipt of the poll frame;

d) thereafter receiving in the communications buffer from the digital device a data frame comprising a succession of data units;

e) turning off at least one interrupt to service the communications buffer such that data transfer speed is independent of said characteristic interrupt latency;

f) indicating by means of said poll frame the beginning of a block of data to be transferred;

g) after a first data frame has been transferred, transferring at least one additional data frame in accordance with steps a) to e); and h) indicating by means of a last poll frame the end of the block of data to be transferred.

2. The method of claim 1 wherein the data frame is sent on a substantially error-free link.

3. The method of claim 2 wherein the data frame is transferred in accordance with an HDLC protocol.

4. The method of claim 3 wherein the poll frame includes a length field, and the computer counts a number of data bytes received to determine when a last data byte has been received, whereby overhead processing by the computer is reduced.

5. The method of claim 1 wherein said poll frame includes a data stream identifier.

6. The method of claim 1 wherein, during the transfer of additional data frames, poll frames following a first poll frame are appended to a preceding data frame.

* * * * *